Jan. 26, 1937.　　W. F. GROENE ET AL　　2,069,107
MACHINE TOOL
Filed May 7, 1935　　12 Sheets-Sheet 3

INVENTORS.
WILLIAM F. GROENE,
WALTER R. MEYER,
BY AND GEORGE W. LUNING.
Allen & Allen
ATTORNEYS.

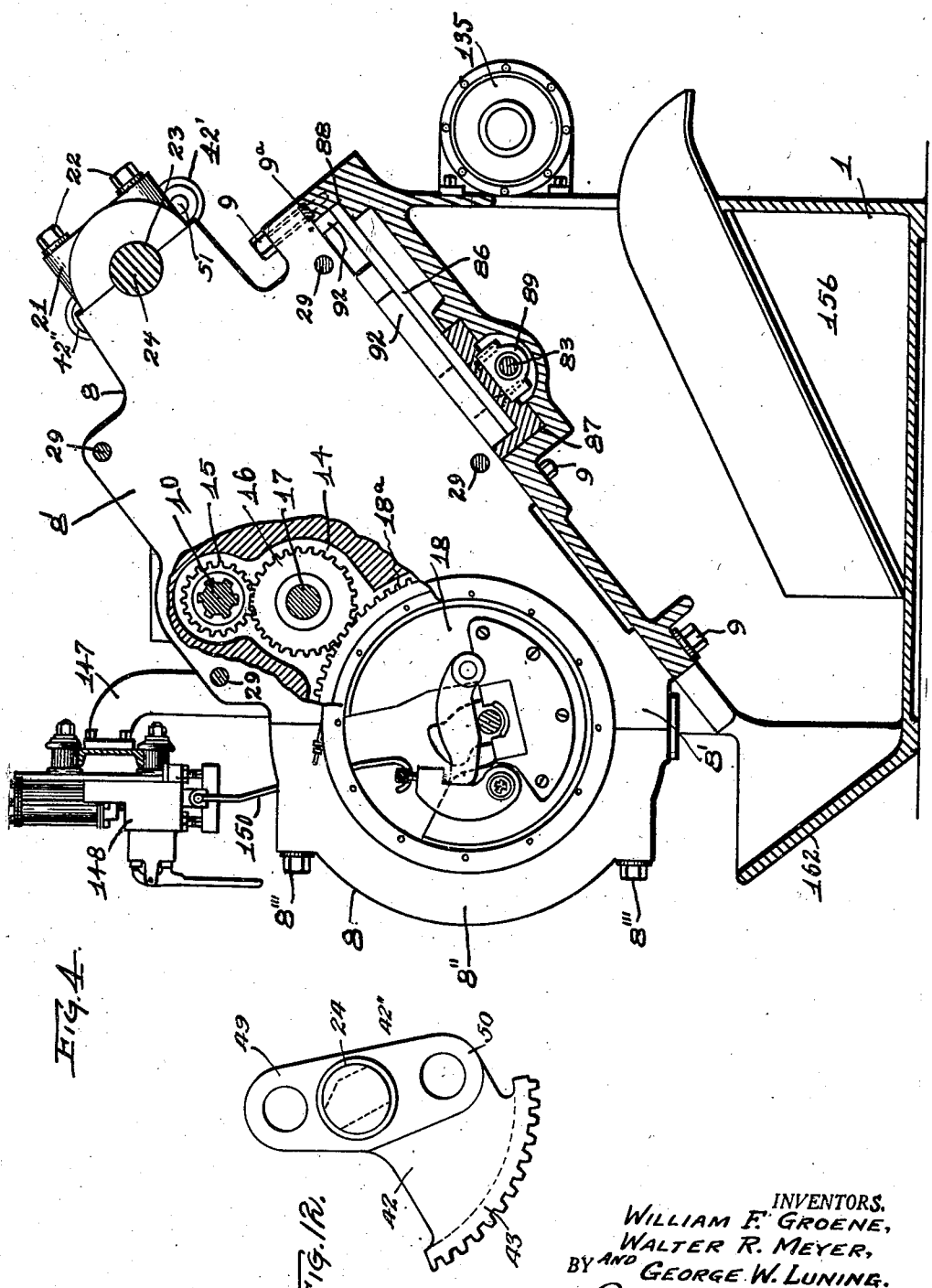

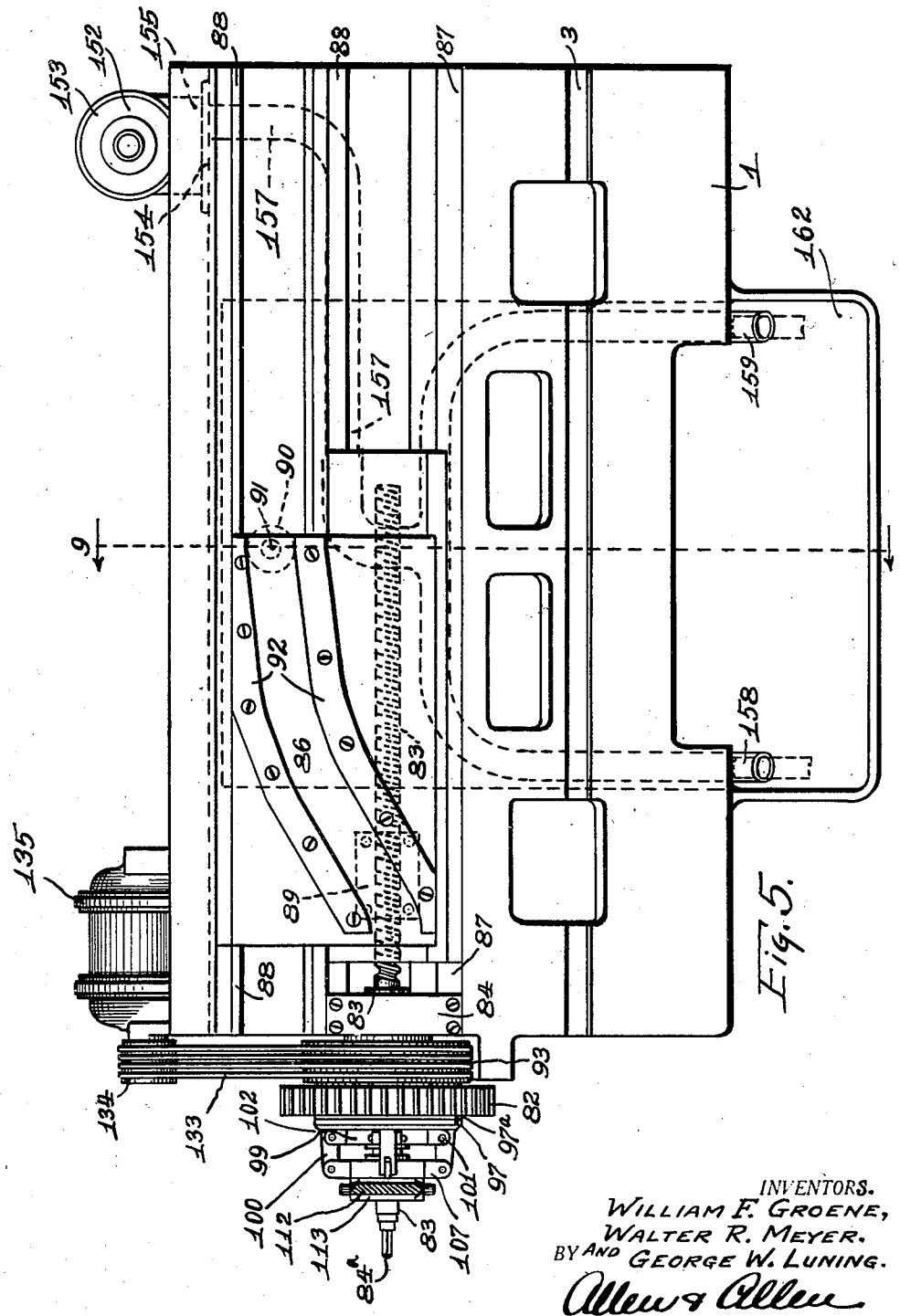

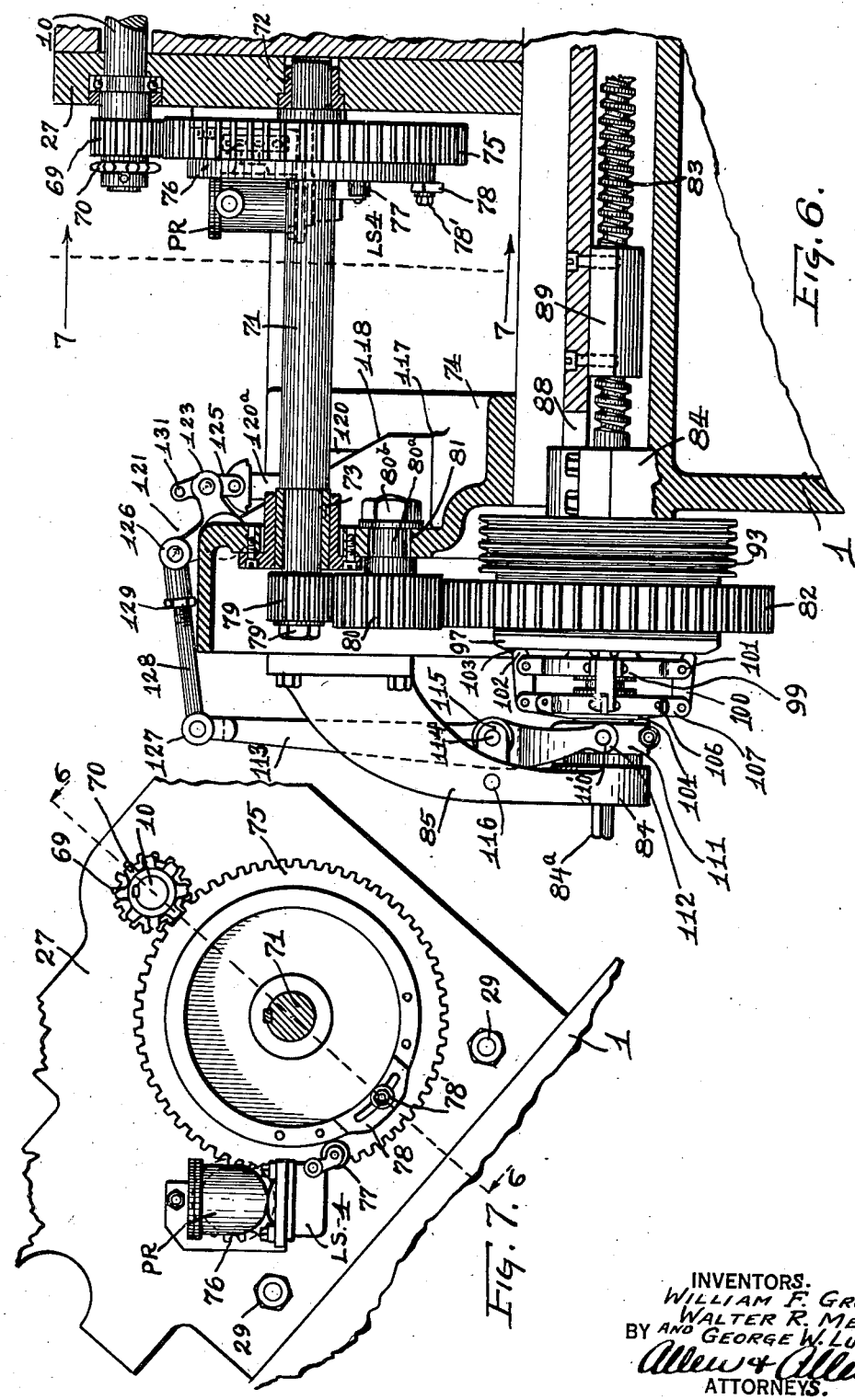

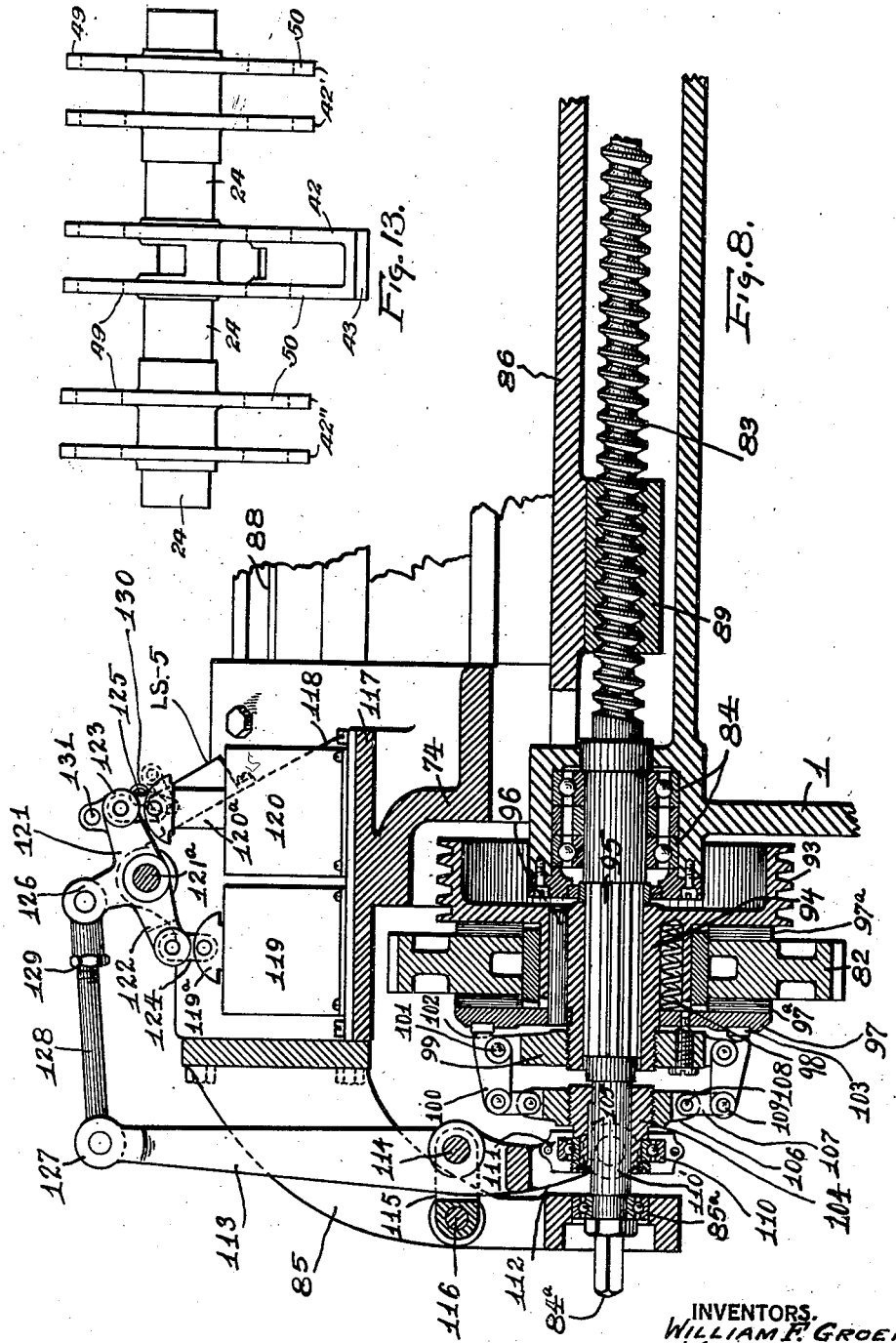

Jan. 26, 1937.　　W. F. GROENE ET AL　　2,069,107
MACHINE TOOL
Filed May 7, 1935　　12 Sheets-Sheet 8
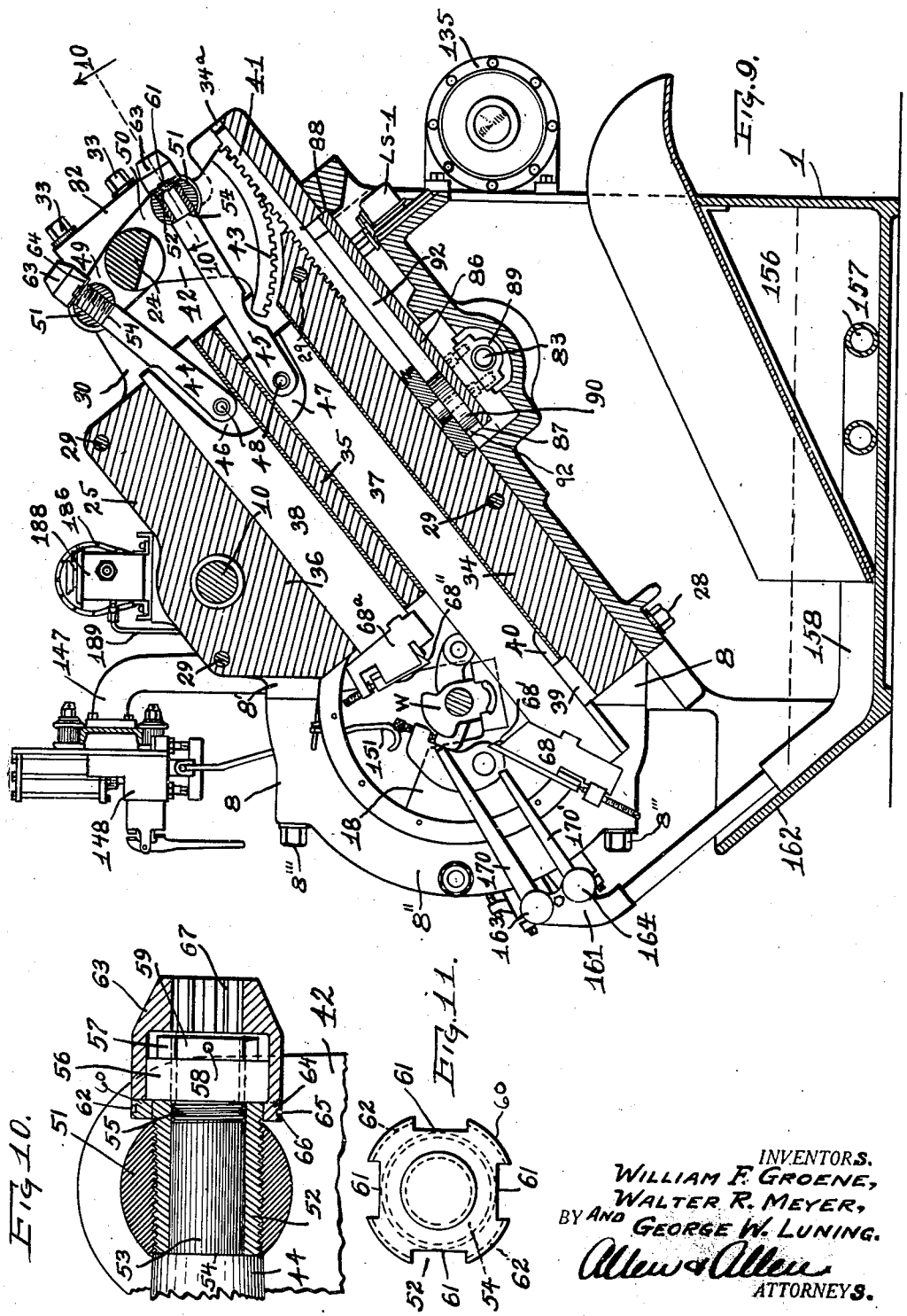
INVENTORS.
WILLIAM F. GROENE,
WALTER R. MEYER,
BY AND GEORGE W. LUNING.
Allen & Allen
ATTORNEYS.

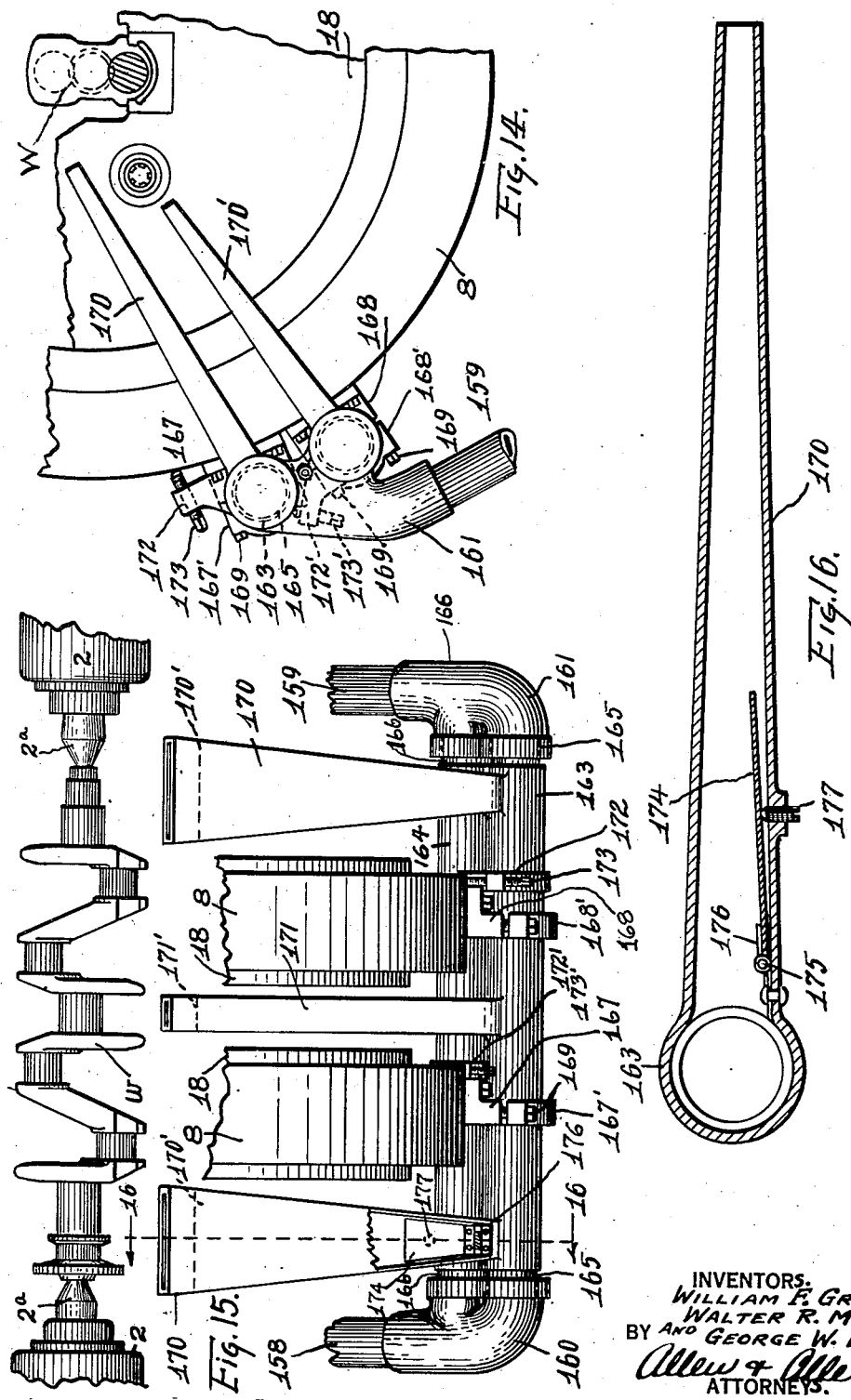

Jan. 26, 1937.   W. F. GROENE ET AL   2,069,107
MACHINE TOOL
Filed May 7, 1935   12 Sheets-Sheet 10
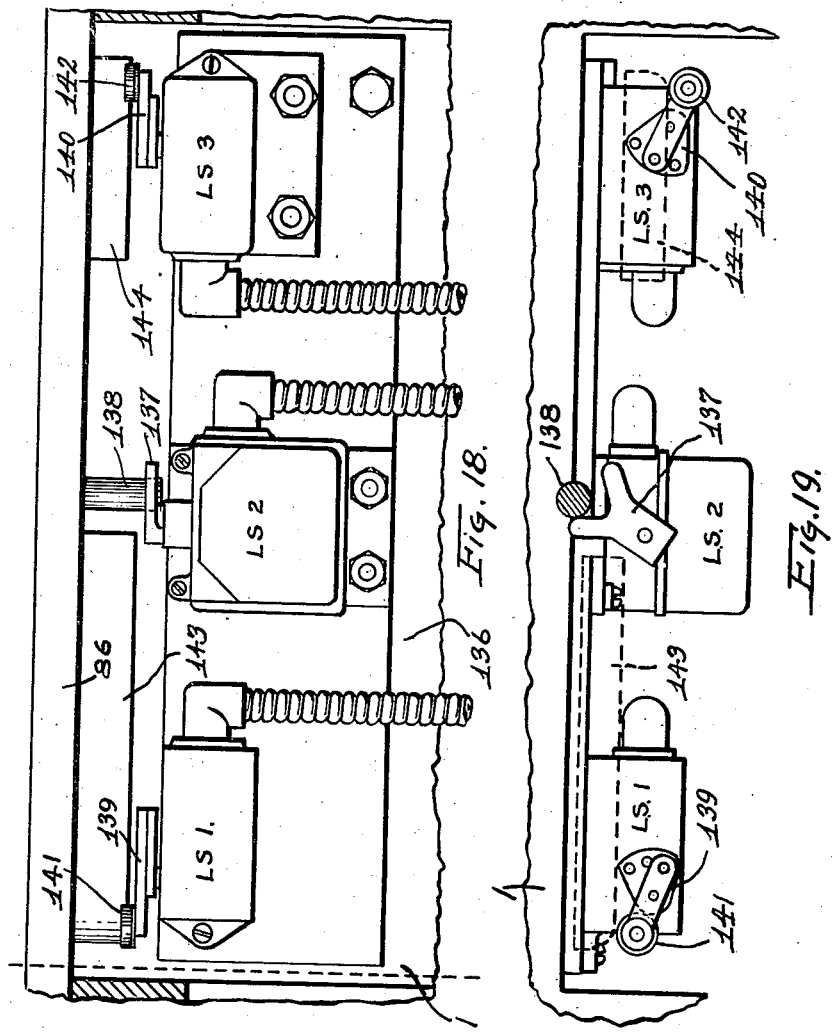
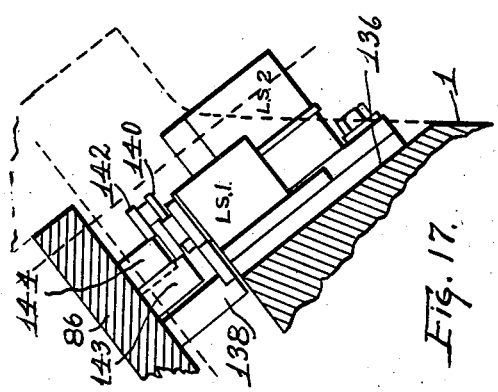
INVENTORS.
WILLIAM F. GROENE,
WALTER R. MEYER,
BY AND GEORGE W. LUNING.
ATTORNEYS.

Jan. 26, 1937. W. F. GROENE ET AL 2,069,107
MACHINE TOOL
Filed May 7, 1935 12 Sheets-Sheet 11
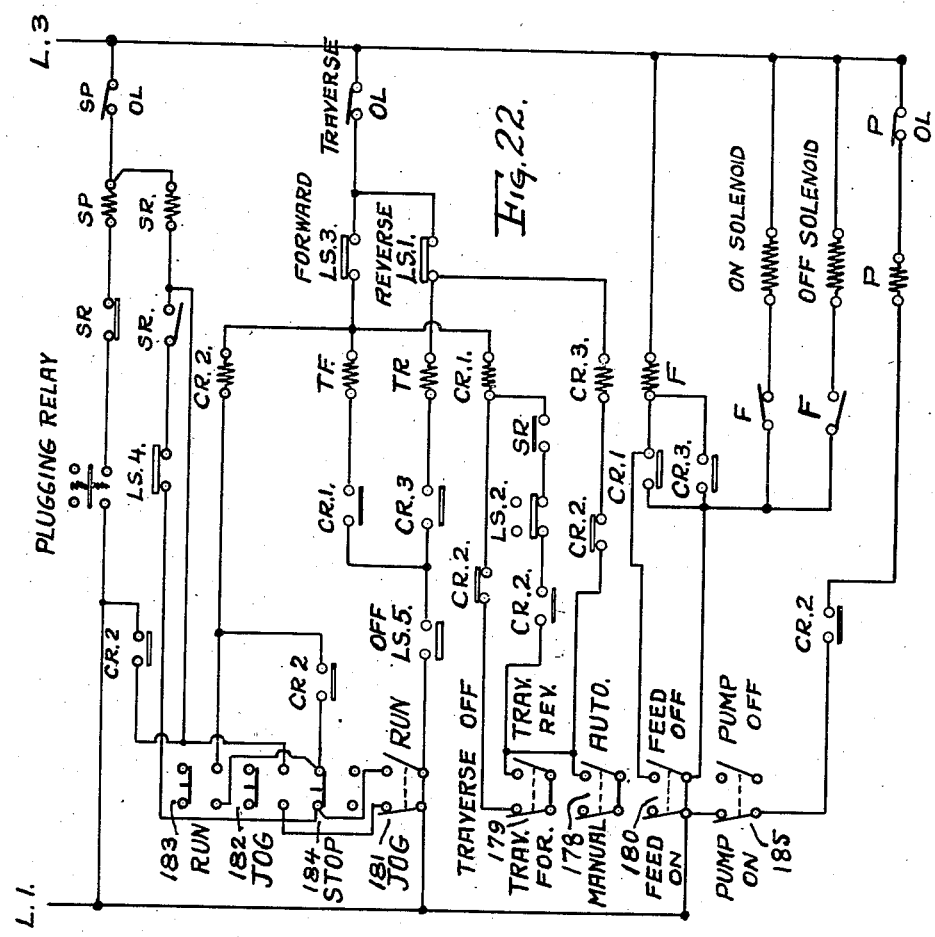
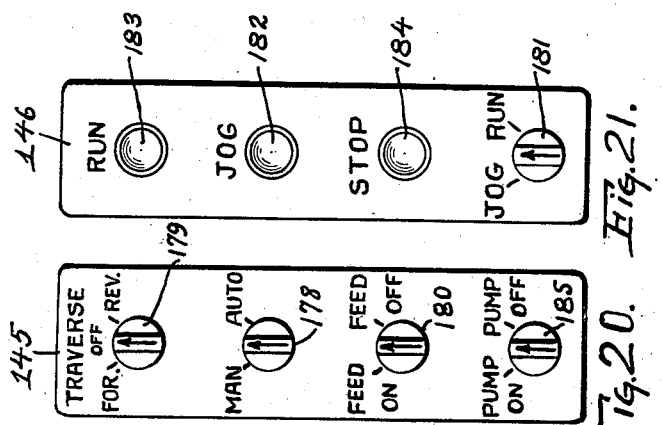
INVENTORS.
WILLIAM F. GROENE,
WALTER R. MEYER,
BY AND GEORGE W. LUNING.
Allen & Allen
ATTORNEYS.

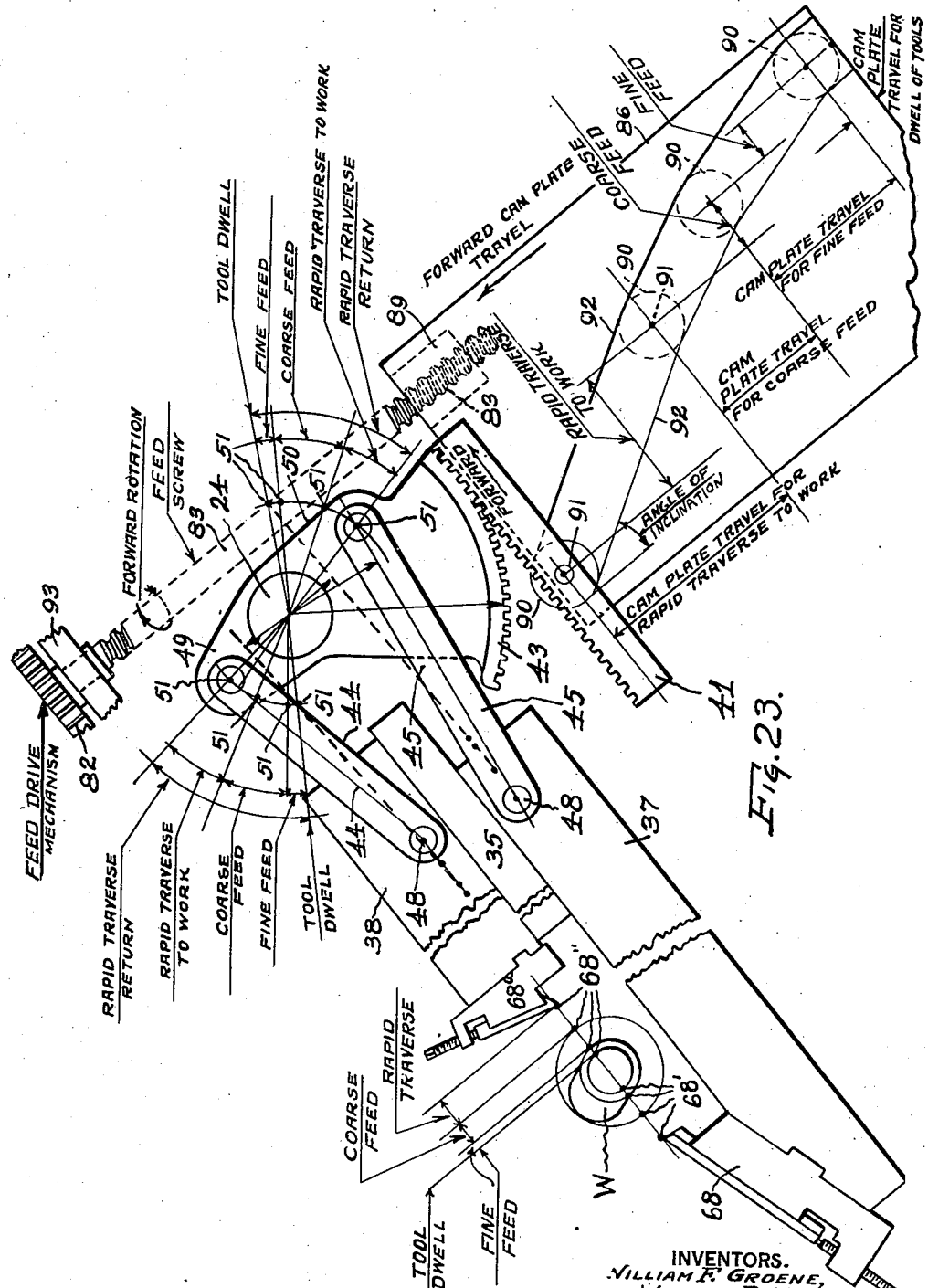

Patented Jan. 26, 1937

2,069,107

UNITED STATES PATENT OFFICE 2,069,107

MACHINE TOOL

William F. Groene, Walter R. Meyer, and George W. Luning, Cincinnati, Ohio, assignors to The R. K. Le Blond Machine Tool Company, Cincinnati, Ohio, a corporation of Delaware Application May 7, 1935, Serial No. 20,220

31 Claims. (Cl. 82—9)

Our invention relates to machine tools, and will be described in connection with a heavy duty lathe for turning the line bearings of crank shafts.

One object of our invention is the provision of a novel construction for lathes particularly of the center drive chuck type making for extreme rigidity and accuracy, and the rapid accomplishment of heavy work.

Another object of our invention, broadly stated, is to dispense with hydraulic devices in machines of this character, and to use in the place thereof a system of electrical control of the times and rates of feed of the tools and the work relatively to each other.

Certain advantages are gained over the hydraulic control and operation in better adaptation of the feeding force to the work, as this force is required to be varied in the different stages of feed; and in the simplification of the machine by eliminating cumbersome piping, often requiring movable joints, and involving the use of very complicated mechanism, together with control valves, relief valves, and the like, and also requiring great care in regard to leakage from the hydraulic system. Power is being applied constantly to the fluid, whether the machine is in operation or not, whereas with the electrical control there is a use of power somewhat in direct proportion to the time during which actual operations are being performed.

A particular advantage of our present invention over the usual hydraulic system, is in the case of the very slow rate of feed with correspondingly heavy cutting force, near the finish of the cut; at which time, with hydraulic feeding, slippage and leakage in the working parts may occur, especially after a considerable wear of the parts and also to the change of viscosity of the liquid. The rate of feed of the tools changes, and sometimes the tools even stop without properly finishing the work, on account of these defects of the hydraulic system.

By our use of electrical control, with the mechanism constructed for ready response to such control, and especially with ample means of adjustment to insure a maximum of accuracy in the operation of tools, we eliminate almost all of the disadvantages of the hydraulic system above referred to, and gain a number of new advantages, as will be seen from the later detailed description.

Other objects of the invention are improvements in the feeding of the cutting tools, the use of cam means for actuating the feeding means, said cam having various inclinations for producing coarse-feed, fine-feed, and dwell of the tools on the work, electrically controlled means for producing effective feeding and rapid traverses of the tool actuating means, and effective braking during changes of speed, and improvements in means for adjustably setting the tools.

We have also improved machines of this character in respect of the coolant distribution. We provide substantially complete immersion of the work and tools in the coolant during the machining operation; and along with this there is adequate removal of chips. We accomplish this, notwithstanding the irregular shapes of the work operated upon which heretofore, so far as we know has defeated attempts to provide an adequate immersion and removal of chips. By reducing splashing to a minimum, we attain that close application of the flowing coolant to the chips which is necessary to carry them away and also that close contact with the tools and work which is necessary to effect their proper cooling; and, of course, with a minimum of splashing the efficiency is increased and there is less waste of the coolant liquid, reducing not only the comparatively low cost of this liquid, but especially the time required to attend to replenishing it in the machine.

The machine in which our invention is exemplified herein is similar to that disclosed in the patent to Groene et al., No. 1,934,976, of November 14, 1933, application for re-issue of which Serial No. 748,720, filed October 17th, 1934, is copending. The present embodiment resembles the above machine in that there is a pair of tool bars simultaneously moved in opposite directions for feeding to opposite sides of the work piece, and these being mounted on a downwardly, forwardly inclined guiding support, at the forward lower end on which the work is mounted for the opposite approach of the tool bars and the tools thereon. It will be understood, however, that we are not limited, in the application of our present invention, to a machine of that type; our present invention being applicable wherever the control of time and rate of feed of a tool, and the cooling in the operation thereof, are of especial importance. The finishing of crank shafts also involves the use of orbital lathes for turning the crank pins while the shaft is centered in alignment with the line bearings, such as that disclosed and claimed in the patent to Groene et al., Reissue No. 18,662, of November 22, 1932, in which that portion of the machine which supports the tool bars is mounted on master cranks which have the same throw as and rotate in synchronism with the crank shaft which is being finished; the machine therein shown being hydraulically controlled. It will be understood that our present invention is applicable to machines of that character; and although we do not disclose such application to such a machine herein, our present invention is to be understood as having the scope which covers such applications to orbital lathes.

In the general illustration of a lathe to which our present invention is applied, we show a system of loading, in Fig. 1, which is fully disclosed and claimed in the patent to Groene No. 1,700,721, of January 29, 1929. We also illustrate in connection with the present example, chucks such as set forth in copending application, Serial No. 2,638 filed Jan. 21, 1935. It will be understood, however, that we are not limited to the details thus set forth and covered in other patents or applications.

We accomplish these and other objects which will be clear to one skilled in the art upon reading these specifications, by that certain construction and arrangement of parts of which we shall describe an exemplary embodiment. Reference is made to the drawings in which:

Fig. 4 is a vertical front to rear section on the line 4—4 of Fig. 1, a partial section also being taken on the line 4'—4' of Fig. 1, through one of the chuck mountings to show the driving means for the ring gear chuck.

Fig. 5 is a plan view of the inclined top of the base of the lathe, clearly illustrating the feeding cam device.

Fig. 6 is a transverse sectional elevation, the section being on the line 6—6 of Fig. 2, illustrating the clutch control between the main driving shaft and the cam driving mechanism.

Fig. 7 is a left end elevation of the upper part of the mechanism illustrated in Fig. 6.

Fig. 8 is an enlargement of the lower left portion of Fig. 6, showing the clutch mechanism in section on the line 8—8 of Fig. 2.

Fig. 9 is a vertical front to rear section on the line 9—9 of Figs. 1 and 5, clearly illustrating the tool bars and the cam driving mechanism therefor.

Fig. 10 is an enlarged section of part of the adjusting mechanism shown at the upper right in Fig. 9 on the line 10—10 of Fig. 9.

Fig. 11 is a detailed end view of the adjusting nut shown in Fig. 10.

Fig. 12 is a detailed end elevation of one of the feeding cranks with its segment.

Fig. 13 is a rear elevation of the same.

Fig. 14 is a right hand end elevation of part of the coolant system, a portion of a chuck and a crank shaft therein being shown to clearly illustrate the relation of the coolant nozzles to the crank shaft.

Fig. 15 is a fragmentary front elevation of the same.

Fig. 16 is a longitudinal section of one of the coolant nozzles on the line 16—16 of Fig. 15.

Fig. 17 is an enlarged sectional elevation, corresponding to that in Fig. 9, showing the arrangement of the feed and traverse control limit switches.

Fig. 18 is a rear elevation of the same, taken along the line of inclination of the switch device, as shown in Fig. 17.

Fig. 19 is a plan view of the same on the same inclination.

Fig. 20 is a front elevation of one of the remote control switch devices seen at the left in the middle upper part of Fig. 1.

Fig. 21 is a similar view of the other remote control switch seen at the right in Fig. 1.

Fig. 22 is a diagram of the electrical control connections.

Fig. 23 is a diagram illustrating the relation of the various mechanical parts involved in the feed of a pair of tool bars at different stages of the operation.

Figure 1:
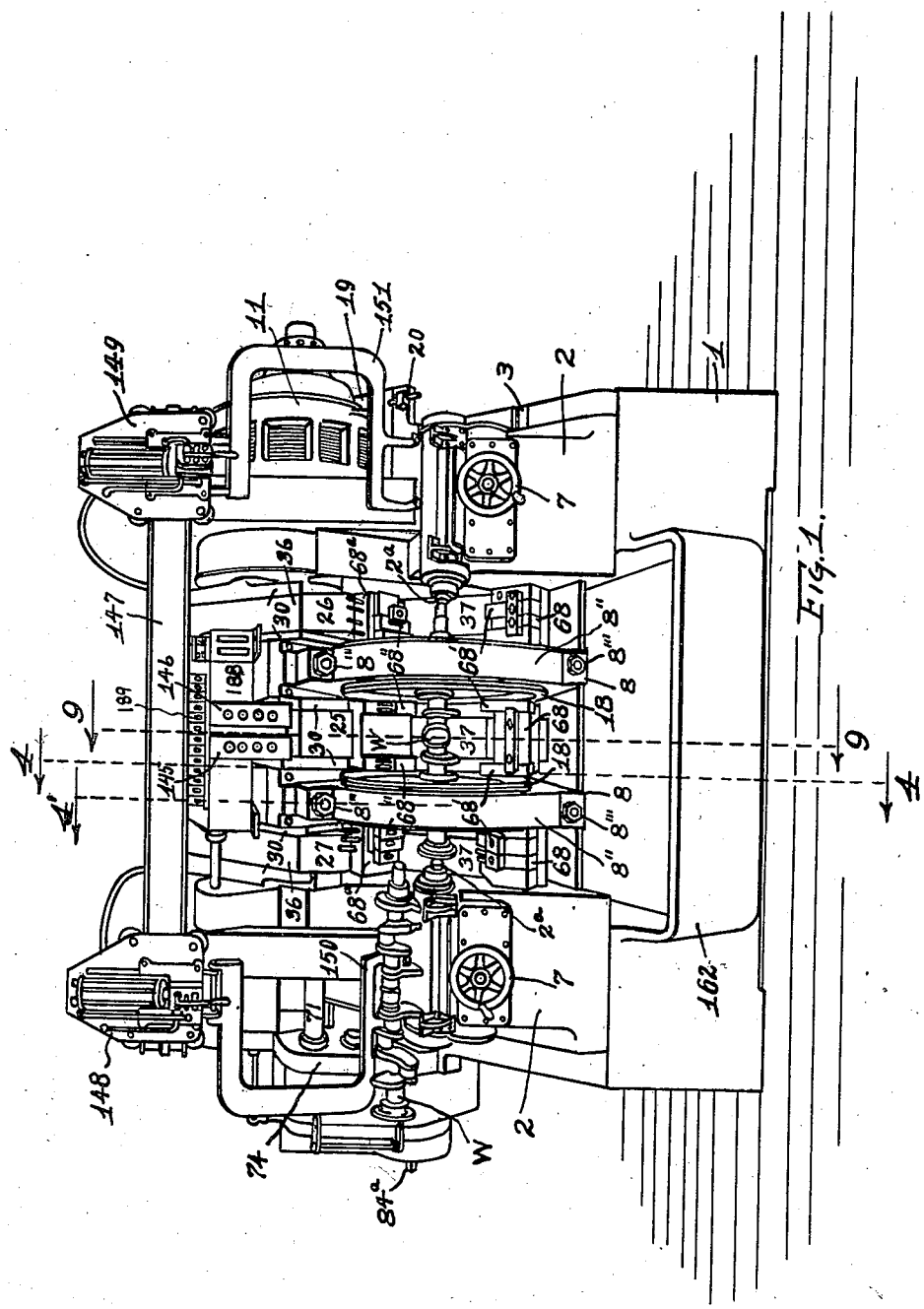
Fig. 1 is a front perspective view of a lathe for turning crank shaft line bearings, embodying our invention.

The general and specific features of our invention as set forth in the appended claims will be appreciated from a description of the exemplary embodiment, to which we now proceed. The exemplary embodiment is a lathe for turning the ends and the line bearings of crank shafts in a single operation together with such facing of the webs as may be necessary. The lathe is equipped with centers but also has center drive chucks of the type which may be loaded by inserting the work through them.

The base 1 has a forwardly and downwardly inclined top, on the front lower end part of which the lathe center housings 2 are mounted. In order to mount these housings accurately in alignment, the base has a slot 3 in which is a block 3a, as seen clearly in Fig. 3, with adjusting screws 4, the block being set in a slot in the base 1, and the screws 4 engaging sides of a slot 5 in the respective housings 2. After this adjustment is made, bolts 6, understood to extend through holes or slots in the housings 2 large enough to permit this adjustment, and threaded into the base 1, are tightened, fixing the housings 2 on the base. Center pins 2a (Fig. 1) slide in the respective housings 2, and are adjusted by hand wheels 7, having a conventional rack connection with the pins 2a. The pins 2a thus may be run back and forth for loading and unloading the work.

Located between the housings 2 are the chuck housings 8 and the tool carrying units 25, 26 and 27. The chuck housings (which will be described first) are secured by bolts 9 to the forwardly downwardly inclined top of the base 1, which bolts 9 pass through sufficiently large holes in the housings 8 to permit slight adjustment of the housings 8 in axial direction along the base 1, before the bolts 9 are tightened; the location of the housings transversely being maintained by a key 9a. Each one of these chuck housings comprises a main body part 8', which bears on and is connected to the base 1, as just described, and extends substantially to the rear upper part of the base, where the key 9a is located; and this body part 8' has a cap part 8'' secured thereto by bolts 8''', as best seen in Fig. 4.

The chucks are mounted in this chuck housing 8, the dividing line of the main part 8' and cap 8'' being through the axis of the chuck.

Upwardly from and to the rear of the chucks, the main driving shaft 10 extends parallel with the chuck axis and has bearings in the respective housings 8'. At the right hand end of the machine, as seen in Fig. 1, a driving motor 11 is mounted on the base 1, and has a pinion 12 meshing with a gear 13 fixed on an extension of the main driving shaft 10 as may be clearly seen in Fig. 3. Each housing 8' has a cavity 14, containing a pinion 15 which is splined on the shaft 10 and meshes with an intermediate gear 16 turning on a stud 17 fixed in the housing. The driven member 18 of the chuck has a peripheral series of teeth 18a meshing with this intermediate gear 16.

Figure 3:
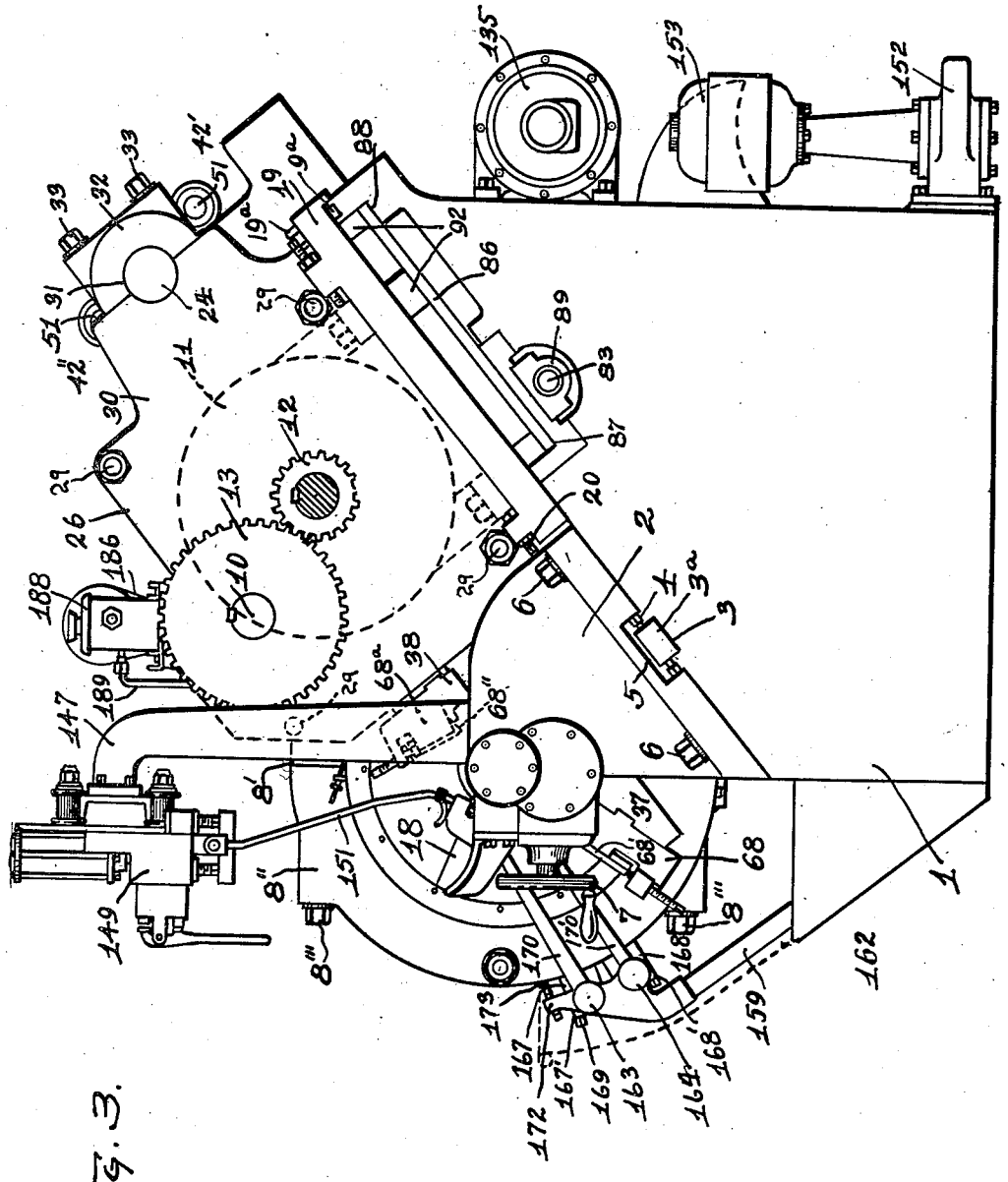
Fig. 3 is a right hand end elevation of the same, the main driving motor being represented by broken lines only.

The driving motor 11 is fixed on a plate 19, held to the base 1 by bolts 19a through sufficiently large holes in the plate to allow proper adjustment of the motor 11 radially to the main driving shaft gear 13 by adjusting means 20, seen in Figs. 1 and 3.

The rear end of each chuck housing body 8' has an extension with a bearing cap 21 secured thereto by bolts 22, for the respective line bearings 23 of a feed crank shaft 24, which determines the movements of tool holders which now will be described.

As here shown, (Fig. 1), the machine is designed to present three sets of tools to a crank shaft held in the chuck bodies 18, one between the two chuck bodies and the other two at respective outer sides of the chuck bodies.

Each set of tool bars is mounted in the respective housings 25, 26, and 27 (Fig. 9) fixed to the base 1 by means of the bolts 28, allowing adjustment of the unit along the base 1 parallel with the axis of the chuck before the bolts 28 are tightened. The assembly of these tool bar housings and chuck housings is preferably similar to that disclosed and claimed in the Groene Reissue Patent No. 18,662, of November 22, 1932; in that the bolts 29 pass through the entire assembly of tool bar housings 25, 26 and 27 and chuck housings 8 and clamp them together; but the parts are so proportioned as to form a continuous mass of metal across the machine, to afford maximum rigidity of the chuck supports and the tool bar supports relatively to each other. This is to say, the chuck housings and the tool carrying units are designed to occupy the space across the lathe and are machined to fit tightly together. No separating means are required. In this case, also, unlike the patent mentioned, the tool bar housings do not move relatively to the chuck housings; the tool bars sliding in the tool bar housings with motions determined by the feed cranks on the feed crank shaft 24.

Our preferred construction of each tool bar housing 25, 26, and 27 comprises side plates 30, shown in Figures 3 and 9, with filler members 34, 35, and 36, between them. The side plates 30 have extensions rearwardly of the filler members corresponding to the rearward extensions of the chuck housings, in which additional bearings 31, with bearing caps 32 held by bolts 33, are provided for the feed crank shaft 24.

Describing the middle tool bar housing 25, the filler members consist of the lower member 34, the narrow middle member 35, and the upper member 36, providing two guideways for the tool bars 37 and 38, in which these tool bars slide parallel with the inclined top of the base 1. The lower tool bar 37 which reaches downwardly and forwardly past the axis of the chucks, has additional guidance forwardly by a key 39 fixed in the lower filler member 34 and fitting in a longitudinal slot 40 in the tool bar. The other two tool housings will be understood to be constructed in a similar manner. On account of the nature of the work, as here shown, the middle tool bar assembly is wider than either one of the outer ones, although it will be understood that we are not limited to such proportions, as these may vary with the nature of the work.

In the middle assembly we mount the rack 41 which is included in the driving mechanism for the feed crank shaft. For accommodating this rack 41, the lower filler member 34 has a slot 34a, the sides of which together with the top of the base and the top of the slot form a guideway for the rack 41.

The feed crank shaft 24, (the purpose of which is to transmit the motion of the rack to the several tool bars in the several housings), has, preferably integral with it, a middle crank member 42, and at each side thereof, crank members 42' and 42'', as shown in Figure 13; each made up of spaced side members, and each located in front-to-rear alignment with a respective set of tool bars. The middle crank 42 is provided with the gear segment 43 (Figure 12), which meshes with the rack 41, as shown in Figure 9; so that reciprocation of the rack 41 oscillates the feed crank shaft 24 and its three cranks 42, 42' and 42''.

Each one of these cranks has an upwardly extending arm and a downwardly extending one for connection, respectively, to the upper and lower tool bar with which it is in front-to-rear alignment. This connection is effected by respective links 44 and 45; the tool bars 37 and 38 having, respectively, recesses 46 and 47 entered by these links, with pins 48 through the links and bearing in the side portions of the tool bars.

To connect the outer ends of the links 44 and 45 to the respective crank arms 49 and 50, each arm has a crank pin 51 journaled in and extending across between its two side portions. Each crank pin 51 has a transverse threaded hole into which is screwed a bushing 52 receiving the reduced cylindrical end part 53 of the respective link 44 or 45, with a shoulder 54 on the rod abutting the forward end of the bushing 52.

The reduced end part of the link extends past the rear of the bushing 52 where it has threads 55 onto which is screwed nut 56 against the rear end of the bushing, and also a lock nut 57 against the rear side of the nut 56; which lock nut 57 has a cotter pin 58 through it and the link rear end portion 59, as seen in Fig. 10.

The bushing 52 has a flange 60 on its rear end, which, as best seen in Fig. 11, has four slots 61 opening radially outwardly at frequent intervals; and it also has grooves 62 extending around those parts of its periphery between the slots 61. A cup 63 fits around the nut 56 and the lock nut 57, and has a series of projections 64 to enter the slots 61 of the flange 60, which projections have the slots 65 arranged to be continuous with the slots 62 of the flange when the projections are in the slot 61 of the flange; whereupon the continuous series of slots receive a snap ring 66 which holds the cup securely on the flange 60. The outer end portion of the cup 63, past the end of the link portion 53, has a splined socket 67 which may receive a splined wrench. By this means, the bushing 52 may be turned in the pin 51, moving forwardly or rearwardly relative thereto because of its threaded connection with the pin, and thus lengthening or shortening the effective length of the link 44 or 45, with the result of adjusting the corresponding tool bar forwardly or rearwardly relatively to the feed crank shaft 24. Although this adjustment may thus be readily effected, the nut 56 may be so adjusted and held by the lock nut 57 and cotter pin 58 that there is practically no lost motion between the link and the feed crank. Thus the tools may readily be adjusted for proper cutting with respect to each other and for ultimate depth of cut.

On the front ends of the tool bars 37 and 38 are carried, respectively, the tool holders 68 and 68a, holding the tools 68' and 68", respectively; the lower tool bar 37 moving rearwardly and the upper tool bar 38 moving forwardly, to feed these tools 68' and 68" respectively, to the work W held in the chucks 18; as may be clearly seen in Fig. 9. This describes only the middle set of tool bars and tools; but it will be understood that the other two sets work in the same manner; all tools being fed uniformly by the feed crank shaft 24 and its unitary crank arms connected to the tool bars by the links as above described; and as oscillated by the meshing of the rack 41 with the gear segment 43 of the middle crank arm.

It is the purpose of the mechanism now to be described to effect the oscillation of the feed crank shaft 24 and feed cranks to provide those rates of feed of the tool bars and tools toward the work W which are desirable at different stages of the feeding operation, as well as to withdraw these from the work when the operation is completed.

The main drive shaft 10 projects to the left of the left hand tool bar housing 27, in which it has a bearing, as before described, and has fixed on it a pinion 69 and a sprocket wheel 70, as shown in Figure 6. To the rear of and below the shaft 10, a transmission shaft 71 has one end journaled in a bearing 72 in the tool bar housing 27, and is journaled near its other end in a bearing 73 in a bracket 74 fixed on the base 1. A gear 75, fixed on the transmission shaft 71, meshes with the pinion 69. At the rear of this gear 70, a plugging relay PR is fixed to the side of the housing 27, and has a small gear 76 meshing with the large gear 75. A limit switch LS—4 is mounted on the bottom of the plugging relay casing, and has an actuating lever 77 with a roller, which is engaged once at each revolution of the large gear 75 by a cam plate 78 fixed on one side of the gear. This cam plate is slotted, with a screw 78' through its slot into the gear 75, so that it may be adjusted circumferentially of the gear for timing the actuation of the limit switch LS—4 (see also Figure 7). The ratio between the pinion 69 and the large gear 75 is the same as that between the pinions 15 and the gears constituted by the teeth 18a on the chuck bodies 18; so that the gear 75 rotates once for each rotation of the chucks.

Figure 2:
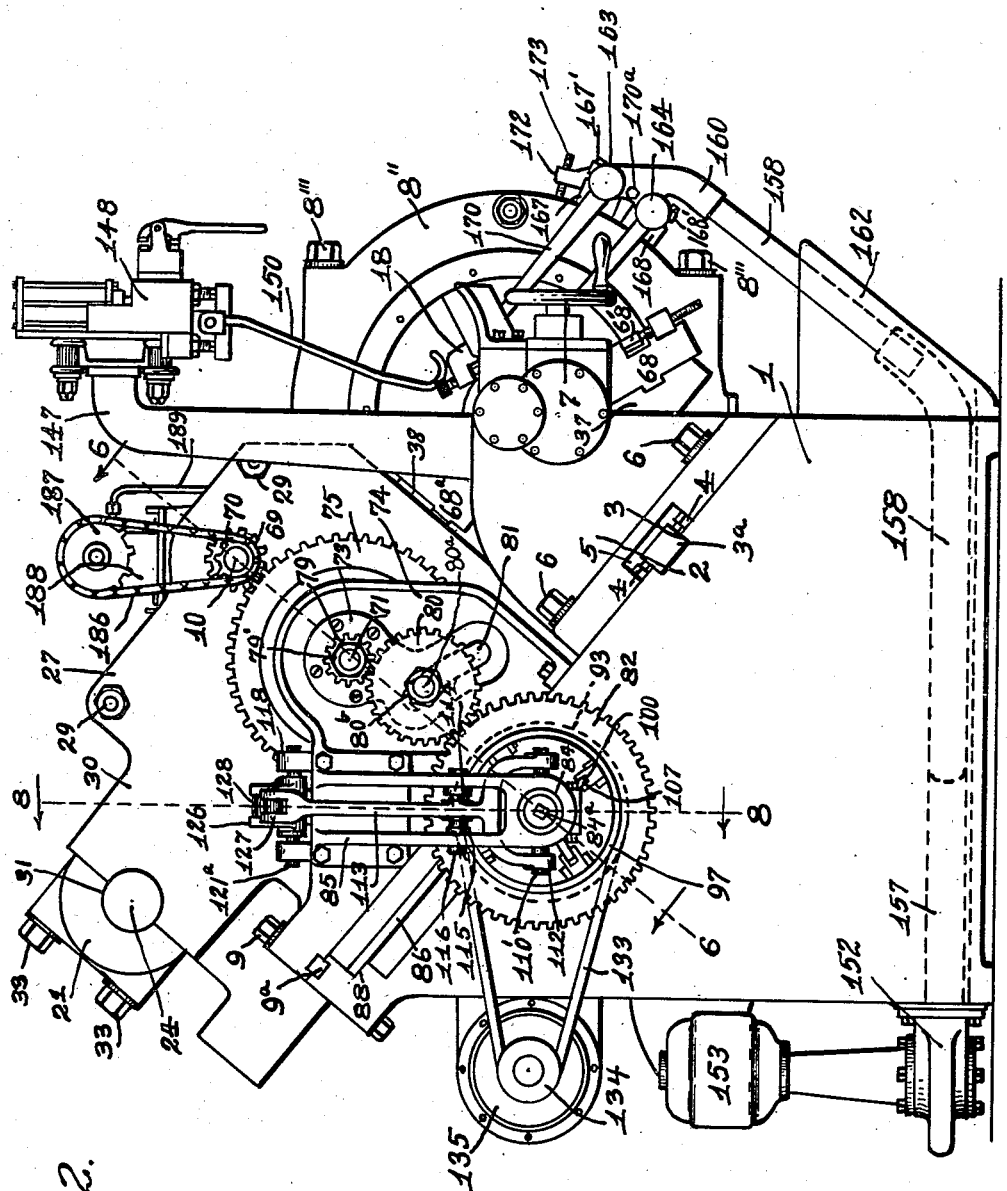
Fig. 2 is a left hand end elevation of the same.

The mechanism now to be described makes operative connection between the shaft 71 and the rack 41 that actuates the tool bars, and the tools carried thereon, toward and from the work W. This mechanism includes a cam actuating the rack 41, and a screw which moves the cam.

Where the shaft 71 projects past its outer bearing 73, it has a pinion 79 removably held on it by securing means including the nut 79'; so that this pinion can be removed and a pinion of different size substituted. Meshing with this pinion is a gear 80 turning on a stud 80a which is clamped by a nut 80b in a slot 81 in the upper part of the bearing bracket 74 (see also Figure 2). This gear 80 meshes with a larger gear 82 down at the rear; and the slot 81 is curved concentric with the axis of this last mentioned gear 82. The gear 80 thus may be mounted anywhere along the slot 81 in accordance with the diameter of the pinion 79 or any different sized pinion substituted therefor.

The feed screw 83 (Figures 5, 6 and 8) is journaled in a bearing 84 on the end part of the base 1, capable of sustaining both radial and axial thrust loads, and in an outer bearing 85a in the lower end of an arm 85 which is screwed to the upper part of the bracket 74 and depends some distance out therefrom. The feed screw 83 has a square projection 84a out past the outer bearing 85a, to receive a suitable crank should it be desired to rotate the feed screw 83 manually.

The cam plate 86 is slidable in suitable guideways 87 and 88, in a depression in the upper rear part of the top of the base 1, parallel with the axis of the chucks. This cam plate 86 has fastened to it a nut 89 through which the feed screw 83 is threaded; so that accordingly, as the feed screw is rotated in one direction or the other, the cam plate 86 is slid in one direction or the other; it being understood that the feed screw 83 is so mounted in its bearings that it has no appreciable movement in an axial direction. A roller 90 rotatable upon a stud 91 depending from the rack 41 (Figures 5 and 9), is received between the cam bars 92 screwed to the top of the cam plate 86. These cam bars 92 have their faces with which the roller 90 contacts inclined in various degrees to the direction of sliding of the cam plate 86; so that sliding of the cam plate will slide the rack bar forwardly or rearwardly and operate the feed crank 24 accordingly, with rates of advance or withdrawal of the tool bars depending upon the angles of inclination of the cam bar surfaces.

Next to the bearing 84 is a grooved pulley 93, having a long hub 94 held to the feed screw 83 by splines 95, as seen in Fig. 8. This hub 94 carries pins 96 projecting outwardly therefrom parallel with the axis; and surrounding and free to rotate on this hub is the large gear 82 previously referred to as being driven from the main driving shaft 10 through the gearing above described. A pressure plate 97 is mounted on the pins 96 of the pulley 93; and between this plate 97 and the gear 82, and between the gear 82 and the adjacent side of the pulley 93, respectively, are sets of friction discs 97a, which, when the pressure plate 97 is forced inward, will cause the gear 82 to rotate with the pulley 93 and the feed screw 83. Normally, springs 98 yieldingly hold this pressure plate 97 outwardly, so that the gear 82 is free to rotate relatively to the feed screw 83.

The hub 94 of the pulley 93 extends out beyond the pressure plate 97 and is threaded externally and has screwed on it a spider 99 with arms on which respective levers 100 are fulcrumed at 101; each lever having a lug 102 bearing against a respective pad 103 on the outer face of the pressure plate 97, in such a manner that spreading of the opposite ends of these levers 100 radially outward will cause the levers to press the pressure plate 97 inward to clutch the gear 82 as above described.

For operating these levers 100, a head 104 is slidably keyed at 105 on the screw 83, and is screwed into a spider which has arms 106 which are connected by links 107 and pins 108 and 109 to the outer ends of the levers 100, to have a toggle action for spreading the levers 100 radially outward when the head 104 is slid in toward the clutching device. This head 104 extends out from its threaded connection with the spider and has bearings 110 in a collar 111; which collar is straddled by and pivotally connected at 110' to the members of the forked lower end part 112 of the actuating lever 113, which extends upward and has its fulcrum 114 in the inner end parts of links 115 which are pivoted at 116 to the previously described depending arm 85 that has the outer bearing 85a for the feed screw.

That part of the bracket 74 inward from the mounting of the arm 85 has the form of a table 117 with a side member 118 inclining upwardly and outwardly, at its rear edge. This table 117 supports two solenoids 119 and 120, having movable cores 119a and 120a, respectively, projecting from their tops. On the top portion of the rear side member 118 a T-shaped three-armed lever 121 has the fulcrum 121a at the junction of its three arms. Two arms 122 and 123 project in opposite directions and are connected by pivoted links 124 and 125 to the solenoid cores 119a and 120a, respectively. The third arm 126 extends upwardly and is connected to the upper end part 127 of the actuating lever 113 by a link 128, which preferably has provision at 129 for adjusting its effective length.

A limit switch LS—5 is mounted on the inclined face of the side member 118, and has its operating lever 130 so positioned that this limit switch is actuated as the three-armed lever swings its inner arm 123 downward, by the engagement, with this limit switch lever, of a pin 131 in an upstanding lug on the lever arm 123.

The grooved pulley 93, previously referred to as being splined at 95 to the feed screw 83, is operatively connected by belting 133 to the pulley 134 of the motor 135 mounted on the rear side of the base 1 (see Figure 5). The purpose of this motor 135 is to advance the tools rapidly to cutting position and rapidly return them after each cutting operation. The actual feeding of the tools to the work is effected when the feed screw 83 is clutched to the gear 82 by the clutching means comprising the friction discs 97a and operated through the lever 113 and link 128 from the lever 117, when the solenoid 119 is energized, so that driving force is applied from the main motor 11 through the main shaft 10. The rapid traverse motor 135 is under control of limit switch LS—5, which switch leaves open the circuit of this motor 135 unless it is tripped by the descent of the pin 131 with the lever 117 when the other solenoid 120 is energized to unclutch the feed screw 83 from the gear 82.

The result of this arrangement is to give to the clutch device a braking function, which will prevent over running by bringing the speed of the feed screw 83 and pulley 93 down to the speed of the gear 82, which can control the speed of these parts by its connection through the gearing 80, 78, 75, 69 and main driving shaft 10 to the motor 11, because of the high ratio of this gearing.

The feed cam device, operated by the feed screw 83, controls electrical circuits by means of limit switches LS—1, LS—2, and LS—3 mounted on a wall 136 in a downward continuance of the cavity of the base 1 in which the cam device operates, as shown in Fig. 9, and more clearly illustrated in Figs. 17, 18, and 19. The middle double throw switch LS—2 has a forked actuating lever 137 arranged in such relation to a pin 138 depending from a mid-length portion of the cam plate 86 that this switch lever 137 will be thrown one way or the other in the course of an intermediate part of the travel of the cam plate. The other two switches LS—1 and LS—3 are of such construction that they are normally closed, and they have levers 139 and 140, with upstanding rollers 141 and 142, which are engaged by bars 143 and 144, respectively, to open the respective switches in the course of terminal portions of the travel of the feed cam plate 86.

The electrical system comprising the several electrical devices, including the solenoids 119 and 120, the switch LS—5, the motor 135, the switch LS—4, the plugging relay PR and the last three described switches LS—1, LS—2 and LS—3, is under manual control by a set of switches in control stations 145 and 146, as seen in Fig. 1, mounted on a bracket carried by the forward portion of the center tool unit 25.

A frame 147 supports loading and unloading devices 148 and 149, comprising depending hook members 150 and 151 to engage the work pieces W. The bodies of the chucks 18 are adapted to allow passage of the work piece W through them; the hook members 150 and 151 being U-shaped for the purpose. Such loading and unloading devices not being parts of the present invention, but being fully set forth and claimed in Patent No. 1,700,721 dated January 29, 1929, it is not necessary to further disclose them herein. The chucks shown herein are of the type disclosed and claimed in co-pending application Serial No. 2,638 filed Jan. 21, 1935.

Our present machine also comprises novel means for cooling the tools and flooding the tools and work piece with liquid for efficient removal of the chips; and this apparatus includes a pump operated by an electric motor which also is included in the above mentioned electrical system, with control means for this motor also included in the control station 145.

This coolant and flooding apparatus (see Figures 14, 15, 16, and 3 and 5) comprises a pump 152 mounted on the lower part of the rear side of the base 1 with its shaft vertical and directly connected to its driving motor 153, mounted on the rear side of the base 1 above the pump 152. The intake port 154 and discharge port 155 of this pump enter, through the base of the pump, the water and chip chamber 156 in the bottom of the base 1, close to the bottom of said chamber, insuring that the pump 152 is always primed.

The intake port 154 leads from the chamber 156 directly into the pump 152. A pipe 157, as seen in Fig. 5, leads forward from the discharge port 155 of the pump and turns to the left, and at the middle of the machine extends forward and has branches 158 and 159 leading to the left and right, respectively, and then forward and upward into respective heads 160 and 161 forwardly from and somewhat below the transverse plane of the axis of the chucks 18. This device is not illustrated in Fig. 1, because it would obscure the illustration of the chucks and the tool bars and tools; but as will be seen in Fig. 5, the pipes 158 and 159 are close to the respective sides of the forwardly extended portion 162 of the water and chip reservoir; so that it will be understood that these heads 160 and 161 are in front of the lathe centers 2a; being so positioned to support between them the structure through which these heads discharge the coolant liquid to the portions of the work piece W and the tools operating thereon, between the chucks 18 and at the outer sides of these chucks. This relation is indicated in Fig. 15, where the work piece W is shown held on the centers 2a; and the structure between the heads 160 and 161 is shown in its relation to the work piece. Only the front portions of the chuck housings 8 are shown, their portions that would surround the work piece being omitted.

This structure comprises two manifolds 163 and 164, extending parallel with the axis of the chucks, and having their ends so connected to the respective heads 160 and 161 that they may individually be rotated in the heads but will make liquid tight connection with the heads at 165 and 166, respectively. These manifolds 163 and 164 are supported by brackets 167 and 168 fixed on and extending forward from the respective chuck housings 8; and it will be understood that the supply pipes 158 and 159, thus connected to the manifolds are also supported by these brackets. These brackets are in the form of clamps, each with an outer section 167' or 168' clamped to the main portion 167 and 168 of the brackets by clamp screws 169. In this manner, each manifold may be clamped tightly enough to prevent its turning accidentally, yet may be turned when required.

Nozzles 170 extend rearwardly and upwardly from the upper manifold, communicating with the interior thereof, and having their discharge ends somewhat above the horizontal plane of the chuck axis; these nozzles 170 being located near the ends of the manifold to discharge a flood of coolant liquid to those portions of the work piece at the outer sides of the chucks. A third nozzle 171 in like manner extends from the middle of the upper manifold 163 to discharge to that portion of the work piece W between the chucks.

The lower manifold 164 has a similar set of nozzles 170' and 171' which extend upwardly and rearwardly with their discharge ends somewhat below the horizontal plane of the axis of the chucks. These lower nozzles are shorter than the upper nozzles, as may be seen in Fig. 9; being limited in length owing to the forward projection of the lower tool bar 37, its head 68 and the tool 68' held thereon, as in Fig. 9. The upper manifold 163 has integral with it a lug 172 through which is screwed an adjusting screw 173 bearing against the chuck casing 8; and the lower manifold 164 has a lug 172' integral with it, through which is screwed an adjusting screw 173', bearing against the adjacent lower side of the upper manifold 163. By these adjusting means, the manifolds and the nozzles extending therefrom may be nicely adjusted to discharge the coolant liquid onto the work piece W and the tools in exactly the required relation thereto. At the same time, this adjustment does not hinder the ready swinging of the nozzles 170 and 171 forwardly away from their operating positions to afford easy access to the work piece W and the tools, should inspection or adjustment be found necessary at any time.

Each one of the discharge nozzles 170 or 171 or 170' or 171', is carefully designed to discharge a flood of coolant liquid of large volume, but at a slow rate, without bubbling or splashing of the liquid. This results in streams of liquid so continuous and voluminous as to amount to a total submergence of the tools and the work.

The attainment of this result is aided by the provision of a baffle 174, in each nozzle, which is seen in Fig. 16, having a hinge 175 connecting it to a bottom wall of the nozzle near the junction of the nozzle with the manifold, and extending toward the discharge end of the nozzle for some distance, and being yieldingly held down by a spring 176, against an adjusting screw 177 threaded through the bottom wall of the nozzle, by means of which screw the baffle 174 may be more or less projected across the passage through the nozzle. By this means the volume of the flow of liquid may be very nicely adjusted while the nozzles are in operation, and while the operator may clearly observe the action of the stream discharged from the nozzle.

We find that the proper flow of coolant liquid is well attained by having the nozzle of rectangular cross section at its outlet; the width of which, of course, is dependent upon the axial length of work piece and tools to be flooded; as for instance, in Fig. 15, the two outer nozzles 170 are much greater in width than the middle nozzle 171. The degree of taper, well indicated in Fig. 16, considering the vertical section of the nozzle, is also found well adapted for this purpose. The transverse widening from the junction of the manifold to the discharge end, for the outer nozzle 170, is also an aid in the delivery of large volume at relatively slow speed; and, of course, with the middle nozzle 171 this same result is attained as nearly as possible, consistent with the limited space permitted for this nozzle. This explanation will be understood to apply equally to the lower manifold 164 and its nozzles. Also, it will be understood that, while we have found in a particular instance, an advantage for the shape and proportion of the nozzle just explained, this is not to be understood as limiting. Certain variations in shape and proportion will occur of course, in conjunction with the operation upon work pieces of different proportions, and with tools accordingly disposed. The illustration of the preferred shape and proportion in conjunction with the particular work piece illustrated will, however, indicate the nature of our invention in respect to the discharge of coolant, and the efficient removal of chips by the coolant as it flows away from the work piece and tools.

We have mentioned, as occasion arose, each one of the electrical devices involved in the operation of the machine; and for a clear explanation of the correlation of these devices with each other, as well as with those parts of the machine the operations of which they effect, we refer to the diagram in Fig. 22, illustrating the wiring connections for the electrical system, and also to the diagram in Fig. 23, which clearly illustrates the nature of the operations to be effected in the course of a cycle of operations of the machine, under the control of the electrical system.

The understanding of the electrical system will be facilitated by first considering the series of operations to be effected under the control thereof, as illustrated in Fig. 23. In this diagram the tool bars, the feed crank and their link connections therewith are shown; as also is the segment on the feed crank, the rack meshing therewith and an outline of the slot of the cam plate in which the rack roller engages; as well as the feed screw, its threaded connection to the cam plate and its drive mechanism.

The travel of the cam plate has divisions indicated as for rapid traverse to work, travel for coarse feed, travel for fine feed, stationary condition for dwell, and rapid return to position for the next operation, after its dwell for completion of the finishing operation. These various stages are indicated in terms of cam plate travel by the dimensions downwardly inclined to the right; and in terms of travel of the rack 41 by the dimensions at right angles to those just mentioned; in the lower part of the diagram. Corresponding motions of the feed crank are indicated by angularly separated lines up to the left; and heavy broken lines indicate positions of the connecting links during a final stage of tool feeding operation. Down at the left, dimensions indicate the actual tool bar and tool travel.

It will be observed from this diagram that there is first a rapid traverse of the tools toward the work, not only due to the angle of the cam, but because the drive is then by the rapid traverse motor 135; then two stages of actual cutting travel, the first of which for coarse feed, is of less time duration than the second travel for fine feed, but which has a rate of forward movement of the tool bar and tool, which while considerably slower than the rapid traverse, is considerably faster than the travel for fine feed. The final dwell is of very much shorter time duration, with the tools stationary.

The relative durations of travel and the rates of travel of the tools, in the several stages, are primarily determined by the inclinations of various portions of the cam slot to the line of its travel, and by the extent of these variously inclined portions of the slot along the plate in the general direction of its travel. By reference to the indications of the different stages of swinging of the feed crank and its links therewith, it will be seen that there is a modification introduced between the effects due to cam travel and the actual travel of the tool bars and tools. This is due to the fact that although the rack and segment connections between the cam plate and the feed crank uniformly transform the rectilinear motion of the cam plate to the rotary motion of the feed crank, the angle of each arm of the feed crank and its respective link varies in the course of swinging of the crank, and there is diminution of the feeding motion of the tool bars and tools relative to that of the feed cam as the crank arms more nearly approach positions of alignment with the links.

By reference to the indications of angles and arcs in the upper part of the diagram, it will be seen that the actual rapid traverse to the work and coarse feed are nearly equal in length, but the fact will remain that the rate is much less during the coarse feed than during the rapid traverse; and it will be seen that the rate of fine feed is very much less than either of these, owing to the approach to alignment of the links and crank arms.

It will further be understood that there is an increasing toggle effect as the crank arms and links approach alignment; with a correspondingly greatly increased mechanical advantage in the transmission of the feeding force to the tool bars and tools by the feed crank and its driving feed cam and feed screw. The rapid return, of course, partakes of the variations in rate of travel due to the different directions of the cam plate slot; but this is made far more rapid, by the introduction of the rapid traverse motor 135 into the operation upon completion of the finishing operation, as has before been referred to.

The operation and function of the electrical control system will now be described. The main incoming lines L1 and L3 (Fig. 22) are provided with a main line switch (not shown) as is usual. Remote control push button and selector switch stations are conveniently located for the operator at 145 and 146 (Fig. 1). With the selectors 178 and 179 (Fig. 20) in the "manual" and "traverse-off" positions, respectively, the main line switch may be closed. With the selector switch 180 in the "feed-on" position, the rapid traverse motor 135 (Figs. 2 and 6) can now be jogged in either the forward or reverse direction, by turning the top selector switch 179 in the proper direction. In this manner limit switches LS1 and LS3 (Figs. 15, 16 and 17), can be checked to be sure that their settings are correct to protect the traverse motion against overtravel in the reverse or forward directions. Limit switch LS2 can also be checked to see that it operates in the forward direction at the point where the tools 68' and 68" normally start to engage the work (Fig. 23).

With the selector switch 181 (Fig. 21) in the "jog" position the main drive motor 11 (Fig. 3) may be jogged by operating the "jog" push button 182. To check the adjustment of the plugging relay PR and the setting of limit switch LS4, (Figs. 8 and 9) the "jog-run" selector 181 (Figs. 21 and 22) can be turned to the "run" position, and the "run" push button 183 pressed. After the main drive motor 11 has accelerated to full speed the "stop" push 184 button may be pressed and the stopping position of the chucks 18 noted, it being necessary to stop the work holding chucks 18 at a predetermined position in order to facilitate loading and unloading of the work W. Since the gear 70 (Figs. 8 and 9) rotates in synchronism with the two chucks 18 as before described, a definite relationship is automatically established between the desired stopping position of the center drive chucks and the proper location of actuating dog 78 for limit switch LS4. For this, the adjustment 78' is provided so as to allow a nice final adjustment of the exact stopping point of the chucks. The plugging relay PR, should be adjusted so that plugging contactor SP (Fig. 22) opens, just as the motor comes to standstill and before it starts in the reverse direction.

With bottom selector switch 185 (Figures 20 and 22) turned to the "pump on" position and the selector switches 178 and 180 set at "automatic" and "feed on" positions respectively (Fig. 23), the lathe is ready for an automatic cycle. Pressing the "run" push button 183 (Figs. 21 and 22) picks up control relay CR2 (Fig. 22) which starts the coolant pump 152 and the main drive motor 11. Contacts on relay CR2 energize coil CR1 which in turn causes solenoid contactor F to pick up, de-energizing the "on" solenoid 119 and energizing the "off" solenoid 120 (Fig. 7), which disengages the feed clutch mechanism, as already described, throwing the main feed off. Bell crank 117 is thus rocked to the right and, through the means 131, as described, closes limit switch LS5, and with relay CR1 (Fig. 22) closed, contactor TF closes, energizing the rapid traverse motor 135 in the forward direction. When limit switch LS2 (Figs. 15 and 16) is tripped, relay CR1 is opened, which stops the rapid traverse motor 135 and opens contactor F, causing the "off" solenoid 120 to be de-energized and the "on" solenoid 119 to pull the feed clutch back into engagement.

When the cam plate 86 and tools 68' and 68" are fed forward sufficiently to trip the limit switch LS3, (Figs. 15 and 16) relay CR2 (Fig.

22) opens, stopping the spindle motor and energizing relay CR3. This relay in turn energizes contactor F which changes the control circuit to again allow the "on" solenoid (Fig. 7) to pull the feed clutch open, closing limit switch LS5 and energizing the reverse traverse contactor TR. The cam plate and tools then rapidly traverse back to the starting position where limit switch LS1 is tripped, de-energizing relay CR3 and traverse contactor TR. As soon as relay CR3 opens, contactor F again opens, the feed clutch is re-engaged serving as a brake to prevent overtravel of the cam plate and the tools.

It will be noted as already described that the control is arranged so it is impossible to energize the rapid traverse motor 135 unless the selector switch is in the "feed on" position to be sure that the feed clutch will be automatically engaged as soon as the traverse motor is de-energized so as to prevent excessive coasting in either direction.

The control is also arranged so that if the tools are permitted to feed up to the point where limit switch LS3 is tripped, under manual operation, relay CR2 is tripped as it is under automatic operation, stopping the main drive motor 11 and thereby preventing overtravel.

The traverse selector switch 179 (Figs. 20 and 22) has no control function during the automatic cycle, and may be left in any position although it is usual to leave it in the "traverse-off" position to avoid a surprise operation when the manual control is selected.

During the automatic cycle, by turning the bottom selector switch 185 (Figs. 20 and 22) to the "pump-off" position, the coolant pump 152 may be stopped momentarily to arrest the flow of coolant onto the work and tools for inspection of the machining operation.

During automatic operation, pressing the "stop" button 184 at any time will stop the main drive motor 11 and chucks 18 and cause the tools immediately to traverse back to the starting position.

An interlock on the spindle running contactor SR prevents relay CR1 being closed on the automatic cycle unless the main drive motor 11 is running, so that rapid traverse motor 135 is thereby prevented from running the tools up to the work should the main drive motor contactor be opened for any reason.

The sprocket wheel 70 on the main driving shaft 10 has a chain 186 which runs around a sprocket 187 on the shaft of a lubricant pump 188 which is mounted on the top of the adjacent chuck housings 8. Outlets 189 lead from this pump and will be understood to have suitable branches to the various bearings of the machine, so that the pump forces lubricant into the bearings at all times when the machine is running.

It will be seen that the principle of the improved machine permits a great range of variation in the proportions between roughing cut feed, finishing cut feed, dwell, and traverse to beginning of cut and traverse from completion of cut back to initial position. Factors contributing to these proportions are the inclinations of the several parts of the cam grooves formed between the cam bars 92, the relative lengths of the two arms of each set in the feed crank 24, and also the normal operating speed of the traverse motor 135, relative to that derived from the operative connection to the main driving shaft which drives the chucks. Thus, different inclinations can be given to the cam bars 92; the arms of the feed crank 24 need not be of the same length; the relation of the links 44 and 45 to the feed cranks may be varied, changing the variation in rates of feed at different stages and modifying the toggle action in the final stages. This toggle action is especially valuable in relieving the parts of the machine of undue strain in the final cutting stages, where steadiness of the machine parts is especially important because of the need of steady application of the tools to the work for correct and accurate finish.

Having thus described our invention, what we claim as new and desire to secure by Letters Patent is:—

1. In a machine of the character described, comprising a rotatable work holder and a tool holder related for relative feed or withdrawal of the work and tool, means for rotating the work holder, and means for causing said relative feed and withdrawal, said means for rotating the work holder being electrically driven, means operating in conjunction with the rotation of the work holder, effective for interrupting current supply for the electrical driving of the rotating means at a predetermined angular position of the rotatable work holder, said interrupting means being normally ineffective, and means operative in conjunction with the means for causing relative feed and withdrawal for rendering said interrupting means operative at a predetermined stage of the feeding and withdrawing cycle.

2. In a machine of the character described, comprising a rotatable work holder and a tool holder movable toward and away from said work holder to cause feed of a tool to work held in the work holder or withdrawal of the tool from said work, an element rotating in conjunction with the rotation of the work holder, mechanism operatively connected to the tool holder to cause its feeding and withdrawing movements, driving means having a source of energy independent of the source of energy for rotating said work holder and said element, means for connecting said mechanism to said element for driving said mechanism in proportion to the rate of rotation of said element, or releasing said mechanism from said element, said connecting and releasing means being effective, upon release, to bring said mechanism under the faster driving action of said driving means.

3. A machine as set forth in claim 2, in which the mechanism comprises a cam device operative on the tool holder and a screw operative upon the cam device and subject, alternatively, to the driving actions therein specified.

4. A machine as set forth in claim 2, in which the mechanism comprises a cam device operative on the tool holder and a screw operative upon the cam device and subject, alternatively, to the driving action therein specified, said mechanism also including, as a connection between the cam device and the tool holder, a crank related to the cam device to be oscillated thereby, and a link connecting the crank to the tool holder and varying the rate of movement of the tool holder toward the work as the angular relation of the crank and the link varies.

5. A machine as set forth in claim 2, in which the mechanism comprises a cam device operative on the tool holder and a screw operative upon the cam device and subject, alternatively, to the driving action therein specified, said mechanism also including, as a connection between the cam device and the tool holder, a crank related to the cam device to be oscillated thereby, and a link connecting the crank to the tool holder and varying the rate of movement of the tool holder toward the work as the angular relation of the crank and the link varies, and readily adjustable means for varying the longitudinal position of said link and said crank.

6. A machine as set forth in claim 2, in which the mechanism comprises a cam device operative on the tool holder and a screw operative upon the cam device and subject, alternatively, to the driving actions therein specified, said driving means being electrically operated, and said machine comprising means moved by the cam device for controlling the supply of current to said electrically operated driving means.

7. A machine as set forth in claim 2, in which the mechanism comprises a cam device operative on the tool holder and a screw operative upon the cam device and subject, alternatively, to the driving actions therein specified, said machine including means for controlling the supply of energy to said driving means, and means operative incident to the movement of said cam device to effect the connection or release therein specified, and permit or interrupt the supply of energy to said driving means at certain stages of movement of the cam device whereby said driving means is effective to cause rapid traverse of the tool to a position for beginning its cutting operation, whereupon the tool is subjected to the driving action of the specified element, until the cutting operation and dwell of the tools is completed, whereupon the tool is again subjected to the action of said driving means for rapid return of the tool to initial position.

8. In a machine of the character described, comprising a rotatable work holder and a series of tools arranged along the axis of the work holder, said work holder and said series of tools being related for relative feed or withdrawal of the work and tools, and comprising means for rotating the work holder, a series of liquid discharge nozzles arranged along said axis, each to discharge to a respective tool of said series, a manifold supporting and in discharging relation to said nozzles, a container to hold liquid and to receive chips from the tools and conduit members in receptive relation to said container, said manifold having its opposite ends in receptive relation to the respective conduit members and connected thereto to permit rotation of the manifold for swinging the nozzles toward or away from the said tool.

9. In a machine of the character described, comprising a rotatable work holder and a tool holder related for relative movement for relative feed or withdrawal of the work and tool, and means for rotating the work holder, the work holder comprising a plurality of chucks, each to operatively engage a portion of a work piece near a respective end of the work piece, each chuck having an opening along but offset from its axis of rotation, through which the work piece may be inserted to or from the position in which it is operatively engaged by the chucks, and a plurality of devices, each operative adjacent one of the chucks at the side thereof, remote from the space between the chucks, to support a work piece at various elevations, and each device comprising means to supportingly engage the work piece, which means is insertible through the respective chuck openings, whereby one device is adapted to insert a work piece into, the other device is adapted to withdraw a work piece from, the space between the chucks.

10. In a lathe, a bed, a plurality of center drive chucks, housings therefor, a plurality of tool actuating means, housings therefor, said housings machined and fitted together and so proportioned in width as properly to locate the tools with respect to work held by said chucks when said housings are fitted tightly against each other, means for holding said housings together so as to form a solid block construction and means for holding said block construction to said bed.

11. In a lathe, a bed, a plurality of center drive chucks, housings therefor, a plurality of tool actuating means, housings therefor, said housings machined and fitted together and so proportioned in width as properly to locate the tools with respect to work held by said chucks when said housings are fitted tightly against each other, means for holding said housings together so as to form a solid block construction and means for holding said block construction to said bed, drive means for said chucks common to said several housings, and drive means for said tool actuating means common at least to the housings thereof.

12. In tool feeding means for a lathe or the like, a housing, tool bars slidable in said housing, tool holding means on said tool bars, a crank shaft, cranks on said shaft and linkage connections between said cranks and said tool bars to produce oppositely directed motion thereof, said cranks and links arranged to approach dead center more closely as said tool bars approach final cutting position.

13. In tool feeding means for a lathe or the like, a housing, tool bars slidable in said housing, tool holding means on said tool bars, a crank shaft, cranks on said shaft and linkage connections between said cranks and said tool bars to produce oppositely directed motion thereof, said cranks and links arranged to approach dead center more closely as said tool bars approach final cutting position, and means for adjusting the longitudinal position of said links with respect to said cranks.

14. In tool feeding means for a lathe or the like, a housing, tool bars slidable in said housing, tool holding means on said tool bars, a crank shaft, cranks on said shaft and linkage connections between said cranks and said tool bars to produce oppositely directed motion thereof, said cranks and links arranged to approach dead center more closely as said tool bars approach final cutting position, a toothed segment operatively connected with said cranks, a rack meshing with said segment and cam means for moving said rack, said cam means having differently shaped portions for different rates of feed and for dwelling the tools on the work.

15. A lathe or the like having a plurality of the tool feeding means claimed in claim 12, said crank shaft being common to the several housings, a toothed segment operatively connected with said crank shaft, a rack meshing with said segment, and cam means for moving said rack, said cam means having differently shaped portions for different rates of feed and for dwelling the tools on the work.

16. In a machine of the character described, having a portion for holding work, a tool, and a conduit for leading liquid to the work and tool, a terminal discharge portion adjustable to discharge liquid onto the work and tool, and like additional terminal discharge portions for the conduit, and a manifold which is rotatable relative to the main part of the conduit and on which the discharge portions are mounted for adjustment, by rotation of said manifold.

17. In a machine of the character described, having a portion for holding work, a tool, and a conduit for leading liquid to the work and tool, a terminal discharge portion adjustable to discharge liquid onto the work and tool by swinging relative to the main part of the conduit, said machine comprising an adjustable stop which limits adjustment of said terminal portion toward the work and tool, but which permits swinging said terminal portion through a relatively wide angle away from the work and tool.

18. In a machine tool, a rotatable work holder and a tool holder adapted for relative movement of the work and tool, means for rotating said work holder, mechanism operative for causing relative feeding movement of the work holder and tool holder, mechanism operative for causing relative rapid traverse movement of the work holder and tool holder, means for alternatively rendering one or the other of said mechanisms operative, and means cooperating with said mechanisms to produce variable rates of feeding and rapid traverse relative movements of said work holder and tool holder.

19. In a machine tool, a rotatable work holder and a tool holder adapted for relative movement of the work and tool, means for rotating said work holder, mechanism operative for causing relative feeding movement of the work holder and tool holder, mechanism operative for causing relative rapid traverse movement of the work holder and tool holder, said first mentioned mechanism being driven by the means for rotating said work holder, said second mentioned mechanism being driven by means independent of the means for rotating said work holder, means for alternatively rendering one or the other of said mechanisms operative, and means cooperating with said mechanisms to produce variable rates of feeding and rapid traverse relative movements of said work holder and tool holder.

20. In a machine tool, a rotatable work holder and a tool holder adapted for relative movement of the work and tool, means for rotating said work holder, mechanism operative for causing relative feeding movement of the work holder and tool holder, mechanism operative for causing relative rapid traverse movement of the work holder and tool holder, means for alternatively rendering one or the other of said mechanisms operative, and means cooperating with said mechanisms to automatically produce a predetermined decrease in rate of feeding and rapid traverse relative movements as the work and tool relatively approach, and to produce a corresponding increase in said rate as the work and tool relatively recede.

21. In a machine tool, a rotatable work holder and a tool holder adapted for relative movement of the work and tool, means for rotating said work holder, mechanism operative for causing relative feeding movement of the work holder and tool holder, mechanism operative for causing relative rapid traverse movement of the work holder and tool holder, means for alternatively rendering one or the other of said mechanisms operative, and means cooperating with said mechanisms to produce a predetermined series of different rates of feeding and rapid traverse relative movements of the work and tool.

22. In a machine tool, a rotatable work holder and tool holder adapted for relative movement of the work and tool, means for rotating said work holder, mechanism operative for causing relative feeding movement of the work holder and tool holder, mechanism operative for causing relative rapid traverse movement of the work holder and tool holder, means for alternatively rendering one or the other of said mechanisms operative, means cooperating with said mechanisms to produce a predetermined series of different rates of feeding and rapid traverse relative movements of the work and tool, and means for automatically rendering said series of movements operative in a predetermined sequence.

23. In a machine tool, a rotatable work holder and a tool holder adapted for relative movement of the work and tool, means for rotating said work holder, mechanism operative for causing relative feeding movement of the work holder and tool holder, mechanism operative for causing relative rapid traverse movement of the work holder and tool holder, means for alternatively rendering one or the other of said mechanisms operative, means cooperating with said mechanisms to produce a predetermined series of different rates of feeding and rapid traverse relative movements of the work and tool, means for automatically rendering said series operative in a predetermined sequence, and means for manually causing any particular movement of said series to become operative.

24. In a machine tool, a rotatable work holder and a tool holder adapted for relative movement of the work and tool, an actuating means movable at constant speed, a member moved at variable speed by said actuating means, and a second member actuated by said first mentioned member, said second mentioned member automatically imparting a decreasing variable relative movement of the work holder and tool holder as the work and tool relatively approach.

25. In a machine tool having cutting tools disposed at opposite sides of a work piece, means for supporting and rotating said work piece, tool holders reciprocable in opposite directions relative to said work piece, means for reciprocating said tool holders at predetermined variable rates of movement, and power means for actuating said reciprocating means, said reciprocating means automatically imparting a decreasing relative rate of movement to said tool holders as the tools relatively approach the work piece and imparting an increasing relative rate as the tools relatively recede from the work piece.

26. In a machine tool having cutting tools disposed at opposite sides of a work piece, means for supporting and rotating said work piece, tool holders reciprocable in opposite directions relative to said work piece, means for automatically reciprocating said tool holders at individual variable rates of movement, means for moving said reciprocating means at predetermined variable rates of movement, and power means for alternatively moving said last mentioned means at a constant slow and a constant rapid rate of movement.

27. In a machine of the character described, comprising a rotatable work holder and a tool holder movable toward and away from said work holder to cause feed of a tool to work held in the work holder or withdrawal of the tool from said work, an element rotating in conjunction with the rotation of the work holder, mechanism operatively connected to the tool holder to cause its feeding and withdrawing movements, driving means having a source of energy independent of the source of energy for rotating said work holder and said element, means for connecting said mechanism to said element for driving said mechanism in proportion to the rate of rotation of said element, or releasing said mechanism from said element, said connecting and releasing means being effective, upon release, to bring said mechanism under the faster driving action of said driving means, and upon connection, to instantly arrest the faster movement of said mechanism and said driving means.

28. In a center drive lathe for simultaneously machining the end portions and spaced intermediate portions of a work piece, one or more chuck housings with center drive chucks, tool actuator housings with a series of tool actuating means, common driving means for said chucks, motive means for said driving means, common means for moving each of the tool actuating means at various rates of feed, said means also comprising mechanism for effecting different rates of feed for the series of tool actuating means, driving means for said last mentioned means, power means independent of the means for driving said chucks for driving said tool actuating means, a disengageable mechanical connection between said last mentioned driving means and said motive means, and electrical means for automatically de-energizing said power means when said mechanical connection is engaged.

29. In a lathe, means for supporting and rotating a work piece, tool feeding devices operable to feed appropriate tools from each side of said work piece, and coolant supply means for said work piece and tools comprising a pair of manifolds mounted to one side of the axis of the work piece, supply means for said manifolds, nozzles mounted on and communicating with the interiors of said manifolds, said nozzles of one of the manifolds being adapted to direct the coolant flow particularly to the tools on one side of the work, the nozzles of the other of said manifolds being adapted to direct the coolant particularly to the tools on the other side of said work.

30. In a lathe, means for supporting and rotating a work piece, tool feeding devices operable to feed appropriate tools from each side of said work piece, and coolant supply means for said work piece and tools comprising a pair of manifolds pivotally mounted to one side of the axis of the work piece, supply means for the ends of said manifolds, nozzles mounted on and communicating with the interiors of said manifolds, said nozzles of one of the manifolds being adapted to direct the coolant flow particularly to the tools on one side of the work, the nozzles of the other of said manifolds being adapted to direct the coolant particularly to the tools on the other side of said work, both of said manifolds and their respective nozzles being adapted to be swung back away from the center of turning of the lathe to permit access to the cutting tools.

31. In a center drive lathe, a rotatable work holder and a tool holder related for relative movement for relative feed or withdrawal of the work and tool, means for rotating the work holder, the work holder comprising a ring gear chucking device adapted to engage a work piece intermediate its ends, and having an opening along but offset from its axis of rotation, through which the work piece may be inserted to or from the position in which it is operatively engaged by said chucking device, and a plurality of devices, operative on each side of said work holder to support a work piece at various elevations, and each device comprising means to supportingly engage the work piece which means is insertible through said opening in said chucking device, whereby one device is adapted to insert a work piece into, and the other device is adapted to withdraw a work piece from, said chucking mechanism.

WILLIAM F. GROENE.
WALTER R. MEYER.
GEORGE W. LUNING.